(12) United States Patent
Oberg et al.

(10) Patent No.: US 9,077,501 B1
(45) Date of Patent: Jul. 7, 2015

(54) SYSTEMS AND METHODS FOR DETECTING CYCLE SLIP AND/OR FRAMING ERROR

(71) Applicant: Marvell International Ltd., Hamilton (BM)

(72) Inventors: Mats Oberg, San Jose, CA (US); Gregory H. Burd, San Jose, CA (US); Hongxin Song, Sunnyvale, CA (US); Michael B. Madden, Mountain View, CA (US); Qiyue Zou, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/267,458

(22) Filed: May 1, 2014

Related U.S. Application Data

(60) Provisional application No. 61/819,188, filed on May 3, 2013.

(51) Int. Cl.
*H04L 27/06* (2006.01)
*H04L 1/00* (2006.01)

(52) U.S. Cl.
CPC .................................. *H04L 1/0054* (2013.01)

(58) Field of Classification Search
USPC .................................. 375/316, 340, 324, 342
See application file for complete search history.

(56) References Cited

U.S. PATENT DOCUMENTS

| | | | | |
|---|---|---|---|---|
| 5,974,091 | A | * | 10/1999 | Huff .............................. 375/265 |
| 6,477,208 | B1 | * | 11/2002 | Huff .............................. 375/265 |
| 7,602,863 | B2 | * | 10/2009 | Kovintavewat et al. ...... 375/340 |

* cited by examiner

*Primary Examiner* — Ted Wang

(57) ABSTRACT

Systems and methods for detecting cycle slip are provided. In some embodiments, a waveform that represents data samples is received. The waveform may include a predetermined preamble and a predetermined postamble. A first value representing a phase of the predetermined preamble of the waveform may be computed. A second value representing a phase of the predetermined postamble of the waveform may be computed. A detection is made as to whether cycle slip occurred during sampling the received waveform based on a comparison of the first value with the second value.

20 Claims, 2 Drawing Sheets

US 9,077,501 B1

SYSTEMS AND METHODS FOR DETECTING CYCLE SLIP AND/OR FRAMING ERROR

CROSS-REFERENCE TO RELATED APPLICATION

This disclosure claims the benefit of U.S. Provisional Application No. 61/819,188, filed May 3, 2013, which is incorporated herein by reference.

FIELD OF USE

The present disclosure relates generally to signal demodulation and sampling systems and methods, and more particularly, to detecting cycle slip and/or framing error in sampling a signal.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, is neither expressly nor impliedly admitted as prior art against the present disclosure.

Traditional systems receive a waveform that represents digital information and demodulate that waveform to retrieve the digital information. To demodulate the waveform these systems sample the received waveform using an analog-to-digital converter (ADC) and process the resulting sequence using a detector/decoder. Due to various signal condition and quality factors, such as disturbance and noise, the sampling process may erroneously sample the waveform as timing between the samples may vary. To address such sample timing issues, signal condition and quality values are fed back and used to adjust the ADC sampling timing.

SUMMARY

Systems and methods for detecting cycle slip are provided. In some embodiments, a waveform that represents data samples is received. The waveform may include a predetermined preamble and a predetermined postamble. A first value representing a phase of the predetermined preamble of the waveform may be computed. A second value representing a phase of the predetermined postamble of the waveform may be computed. A detection is made as to whether cycle slip occurred during sampling the received waveform based on a comparison of the first value with the second value.

In some embodiments, a portion of the received waveform corresponding to the preamble is sampled to compute the first value. In some implementations, at least one of the predetermined preamble and predetermined postamble corresponds to a periodic pattern. In some implementations, the received waveform is demodulated to retrieve the data samples. In some implementations, a cycle slip is determined in response to determining that a difference between de first value and the second value corresponds co a fixed constant.

In some embodiments, the waveform is sampled using an analog-to-digital converter to produce a sampled output. The data samples are recovered by processing the sampled waveform with a Viterbi decoder.

In some embodiments, control circuitry may be configured to receive a waveform that represents data samples. The waveform may include a predetermined preamble and a predetermined postamble. The control circuitry may be configured to compute a first value representing a phase of the predetermined preamble of the waveform. The control circuitry may be configured to compute a second value representing a phase of the predetermined postamble of the waveform. The control circuitry may be configured to detect whether cycle slip occurred during sampling the received waveform based on a comparison of the first value with the second value.

In some embodiments, the control circuitry may be configured to sample a portion of the received waveform corresponding to the preamble is sampled to compute the first value. In some implementations, at least one of the predetermined preamble and predetermined postamble corresponds to a periodic pattern. In some implementations, the control circuitry may be configured to demodulate the received waveform to retrieve the data samples. In some implementations, the control circuitry may be configured to determine a cycle slip in response to determining that a difference between the first value and the second value corresponds to a fixed constant.

In some embodiments, the control circuitry may be configured to sample the waveform using an analog-to-digital converter to produce a sampled output. The control circuitry may be configured to recover the data samples by processing the sampled waveform with a Viterbi decoder.

BRIEF DESCRIPTION OF THE DRAWINGS

The details of one or more implementations are set forth in the accompanying drawings and the description below. Other features and various advantages will be more apparent upon consideration of the following detailed description, taken in conjunction with the accompanying drawings in which.

DETAILED DESCRIPTION

This disclosure generally relates to detecting cycle slip and/or framing error in sampling a signal. For illustrative purposes, this disclosure is described in the context of a magnetic storage device. It should be understood, however, that this disclosure is applicable to other types of storage devices and also communication systems (e.g., optical storage devices, communication systems, holographic storage devices, or wired and wireless communication systems) from which data is encoded and read using a continuous time waveform.

Figure 1:
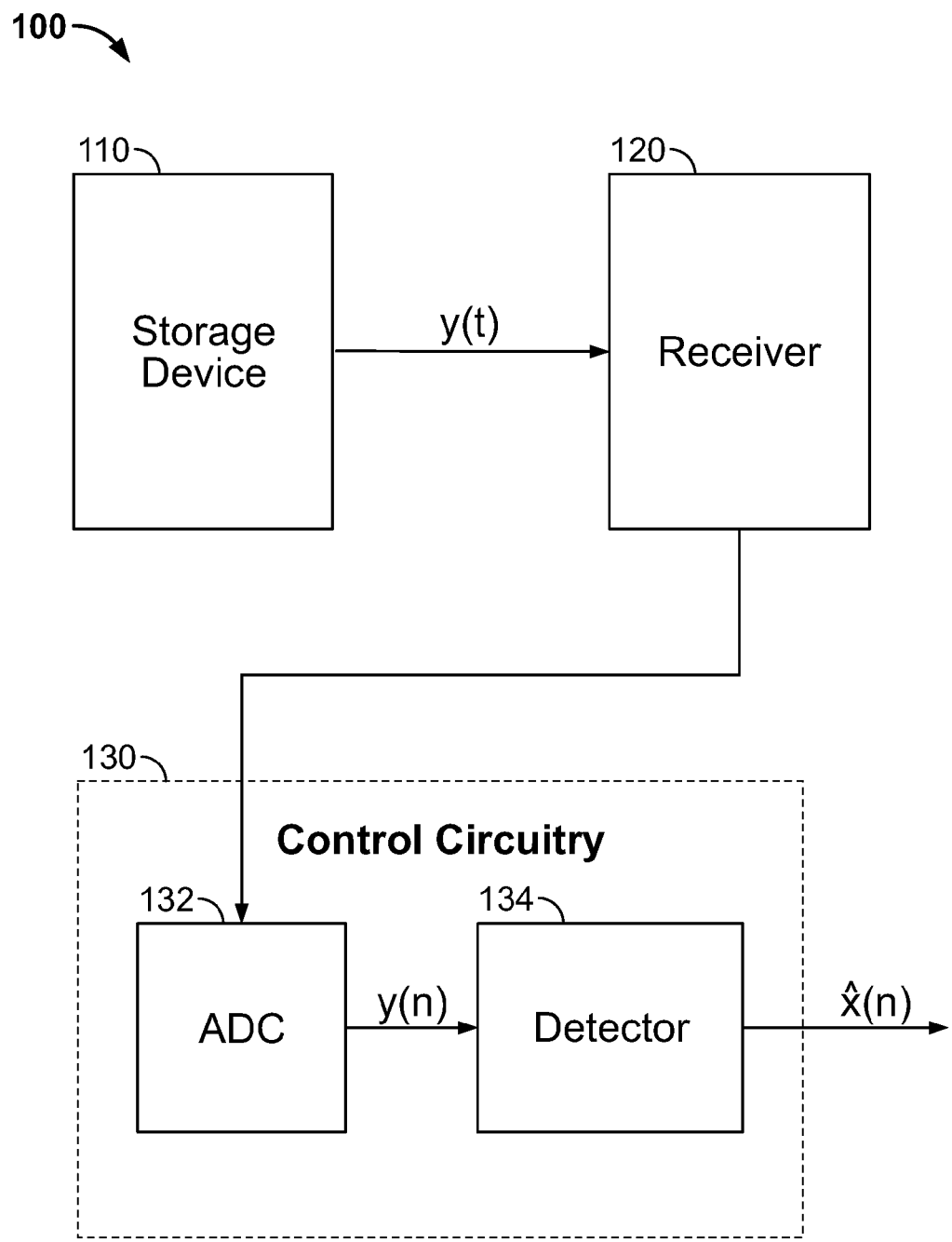
FIG. 1 is a diagram of a system for detecting cycle slip and/or framing error system in accordance with an embodiment of the present disclosure.

FIG. 1 is a diagram of system 100 for detecting cycle slip and/or framing error in accordance with an embodiment of the present disclosure. System 100 includes a storage device 110, a receiver 120 and control circuitry 130. Receiver 120 may receive a waveform that is read from a storage device or received from another external component (e.g., antenna). The waveform received by receiver 120 may represent digital information and may be represented by the function:

$$y(t) = x(n)p(t - nT_0) + w(t)$$

where y(t) is the received waveform, x(n) is the digital information (information bits), p(t) is the pulse shape, and w(t) is noise present in the waveform, and $T_0$ is the sampling period. In some implementations, the waveform may represent a sector of information read from a storage device.

Receiver 120 outputs the received waveform, to control circuitry 130 In some implementations, control circuitry 130 (or portions of control circuitry 130) may be included incorporated into receiver 120. Control circuitry 130 may include an ADC 132 and a detector 134. In some embodiments, control circuitry 130 may include additional components, such as a memory and processor, to supplement or replace ADC 132 and detector 134. ADC 132 samples the received waveform, to output a signal y(n) that represents the received waveform in digital form. In particular, ADC 132 converts the continuous signal y(t) into discrete samples. The process of converting the continuous signal into discrete samples is very time sensitive, as ADC 132 has to sample the continuous signal at precise locations at which the ADC output is the most informative representation of information bits and can be effectively used by subsequent detection process to recover the information bits. Variations in signal condition and quality may cause the continuous ADC samples to not be uniformly spaced in time, requiring ADC 132 to compensate for such time drift when performing the conversion. Severe time drift that cannot be compensated correctly for may lead to cycle slip and framing errors.

In some embodiments, ADC 132 processes a preamble and postamble, which may be used to detect cycle slip (e.g., timing drifts) and/or framing errors. For example, ADC 132 may sample the preamble portion of the waveform. A phase may be computed based on ADC samples in the preamble portion. This phase can be used to adjust initial ADC sampling phase. ADC 132 may sample the postamble portion of the waveform. After sampling the postamble, ADC samples may be used to compute a phase of the postamble. The phase of the postamble may be compared with the phase of the preamble to detect whether or not cycle slip and/or framing errors happened in sampling the waveform.

Detector 134 processes signal y(n) that is output by ADC 132 to retrieve the digital information encoded in the waveform and output the digital information as x̂(n). In some embodiments, detector 134 may include a Viterbi detector.

In some embodiments, a preamble may be added to the beginning of the waveform and a postamble may be added to the end of the waveform. In some implementations, additional patterns may be included at other locations in the waveform (e.g., interleaved with the data portion of the waveform) and used to detect cycle slip and/or framing errors. In some implementations, the postamble may be positioned in the middle of the data portion of the waveform in addition to, or alternative to, being positioned after the data portion of the waveform. The data samples represented by the received waveform may be positioned between samples corresponding to the preamble and samples corresponding to the postamble. In some implementations, the preamble and postamble may be a predetermined sequence and/or a periodic sequence. The preamble and postamble may be a predetermined sequence and/or period sequence that is known to control circuitry 130.

In some embodiments, control circuitry 130 (e.g., ADC 132) may demodulate and sample a portion of the waveform corresponding to the preamble to estimate or compute a first value representing a phase of the preamble portion of the waveform. The first value may be represented as $\Theta_{preamble}$. Control circuitry 130 may use the first value to adjust the initial sampling phase and frequency of ADC 132 before a remaining portion of the waveform is sampled (e.g., before the data and postamble of the waveform is sampled). After computing the first value, control circuitry 130 may store the computed value in memory for later retrieval. In some implementations, the first value may be computed after all of the portions (e.g., preamble, data and postamble portions) of the waveform are sampled. The first value may be computed from acquired ADC samples in the preamble portion of the waveform. In some embodiments, the mathematical formula used to compute The first value from preamble samples may depend on the characteristics of the preamble pattern used.

In some implementations, the first value may be computed as a function of the number of samples that are identified as a result of sampling the preamble portion of the waveform, a total number of expected samples in the waveform (e.g., the total number of samples in the preamble, postamble and data), and an expected period corresponding to she preamble. As referred to herein "expected number" means an amount known to the recipient (e.g., control circuitry 130) that is predetermined and stored before the data against which the expected number is compared is received by the recipient. For example, when the waveform corresponds to a sector of data, control circuitry 130 knows or has stored previously a value indicating how many samples a sector should have.

Control, circuitry 130 may estimate or compute a second value representing a phase of the postamble portion of the waveform. In some embodiments, the second value may be represented as $\Theta_{postamble}$. The second value may be computed from ADC samples that are identified as the postamble portion of the waveform In some embodiments, the second value may be computed as a function of the number of samples that are identified as a result of sampling the preamble portion of the waveform, an expected number of samples in the waveform (e.g., the total number of samples in the preamble, postamble and data), a number of samples that are identified as a result of sampling the data portion or the waveform, a number of samples that are identified as a result of sampling the postamble, and an expected period corresponding to the postamble. Control circuitry 130 may store the second value in memory for subsequent retrieval.

Control circuitry 130 may determine or detect the presence of cycle slip and/or framing error based on a difference between the first and second values. For example, in response to determining that a difference between the first value and the second value corresponds to a predetermined value or constant, control circuitry 130 may determine that no cycle slip and/or framing error is present. In particular, in response to determining that a difference between the first value and the second value corresponds to the predetermined value or constant, control circuitry 130 may determine that there is no need to adjust the process of demodulating or converting the continuous signal to discrete samples. In some implementations, the predetermined constant is a function of a length of the data in the received waveform, and the pattern and/or length of the preamble and postamble. Alternatively, in response to determining that a difference between the first value and the second value does not correspond to the predetermined value or constant (e.g., is different from the predetermined value), control circuitry 130 may adjust the process of demodulating or converting the continuous signal to discrete samples based on a computed cycle slip arid/or framing error. Specifically, control circuitry 130 may determine a value that represents the cycle slip and/or framing error based on the difference between The second value and the first value.

In some embodiments, the preamble and postamble portions are sinusoidal waveforms. The preamble may have the same or different sinusoidal waveform as the postamble. Similarly, the preamble may correspond to the same or different sequence as the postamble. The preamble sinusoidal waveform may have a period equal to $k_{preamble}T_0$ and the postamble may have a period equal to $k_{postamble}T_0$. In addition, the preamble may have a number of samples represented by $n_{preamble}$ and the postamble may have a number of samples represented by $n_{postamble}$. Ideally, the received waveform may be divided into three segments (e.g., a preamble segment, data segment, and postamble segment). The preamble segment may include samples located at positions $0, 1, \ldots, n_{preamble}-1$; the data segment may include samples located at positions $n_{preamble}, n_{preamble}+1, \ldots, n_{preamble}+n_{data}-1$; and the postamble may include samples located at positions $n_{preamble}+n_{data}, n_{preamble}+n_{data}+1, \ldots, n_{preamble}+n_{data}+n_{postamble}-1$.

In some embodiments, control circuitry 130 may compute the first value representing the phase of the preamble in accordance with equation 1 below:

$$\theta_{preamble} = \tan^{-1}\left(\frac{\sum_{n=0}^{n_{preamble}-1} y(n)\cos(2\pi n/k_{preamble})}{\sum_{n=0}^{n_{preamble}-1} y(n)\sin(2\pi n/k_{preamble})}\right)$$

where $\theta_{preamble}$ is the first value, y(n) is the received waveform, $n_{preamble}$ Is a number of samples identified in the predetermined preamble as a result of sampling the waveform, n is a counting index of waveform samples, and $k_{preamble}$ is a constant representing a period of the preamble. Similarly, control circuitry 130 may compute the second value representing the phase of the postamble in accordance with equation 2 below:

$$\theta_{postamble} = \tan^{-1}\left(\frac{\sum_{n=n_{preamble}+n_{data}}^{n_{preamble}+n_{data}+n_{postamble}-1} y(n)\cos(2\pi n/k_{postamble})}{\sum_{n=n_{preamble}+n_{data}}^{n_{preamble}+n_{data}+n_{postamble}-1} y(n)\sin(2\pi n/k_{postamble})}\right)$$

where $\theta_{postamble}$ is the second value, y(n) is the received waveform, $n_{postamble}$ is a number of samples in the predetermined postamble identified as a result of sampling the waveform, $n_{data}$ is a number samples of a data portion of the waveform identified as a result of sampling the waveform, and $k_{postamble}$ is a constant representing a period of the postamble.

Control circuitry 130 may compute a difference between the first and second values to detect cycle slip. For example, control circuitry 130 may compute a difference between $k_{preamble}*\Theta_{preamble}/2\pi$ (e.g., the first value) and $k_{postamble}*\Theta_{postamble}/2\pi$ (e.g., the second value). Control circuitry 130 may compare the computed difference to a predetermined value (e.g., $\Delta\Theta_{target}$). In particular, control circuitry 130 may retrieve the predetermined value from a storage device and compare the retrieved value to the computed difference. In some implementations, the predetermined value may he determined based on the length of preamble and postamble, the length of data, and the preamble and postamble pattern characteristics, etc. For example, one predetermined value may correspond to a waveform received from one type of storage device and a different predetermined value may correspond to a waveform received from a different type of storage device or waveform source (e.g., antenna). In some implementations, control circuitry 130 may cross-reference an identifier of the source of the waveform with a database of predetermined values to retrieve the corresponding predetermined value with which to compare the difference between the first and second values.

In some embodiments, control circuitry 130 may determine that there is no cycle slip or that the cycle slip is negligible when the difference between the first and second values corresponds (is equal to) the retrieved predetermined value. In some implementations, in response to determining that the difference between the first and second values fails to correspond (is not equal to) the retrieved predetermined value, control circuitry 130 may compute a number representing the cycle slip based on the first value, the second value and the predetermined value.

For example, control circuitry 130 may compute the number representing the cycle slip in accordance with equation 3 below:

$$(k_{preamble}*\Theta_{preamble}/2\pi - k_{postamble}*\Theta_{postamble}/2\pi) - \Delta\Theta_{target}$$

In some embodiments, the number of cycle slips that control circuitry 130 can detect may be proportional to or correspond to the period of the preamble and/or postamble portions. For example, given a postamble period $k_{postamble}$, control circuitry 130 may detect no more than $+/- k_{postamble}/2$ cycle slips. In some embodiments, control circuitry 130 may demodulate or decode the received waveform after correcting the cycle slip. In particular, ADC 132 and/or detector 134 may compensate or adjust processing a received waveform based on the detected cycle slip. For example, ADC 132 and/or detector 134 may adjust timing at which samples are identified in a received waveform based on the cycle slip.

Figure 2:
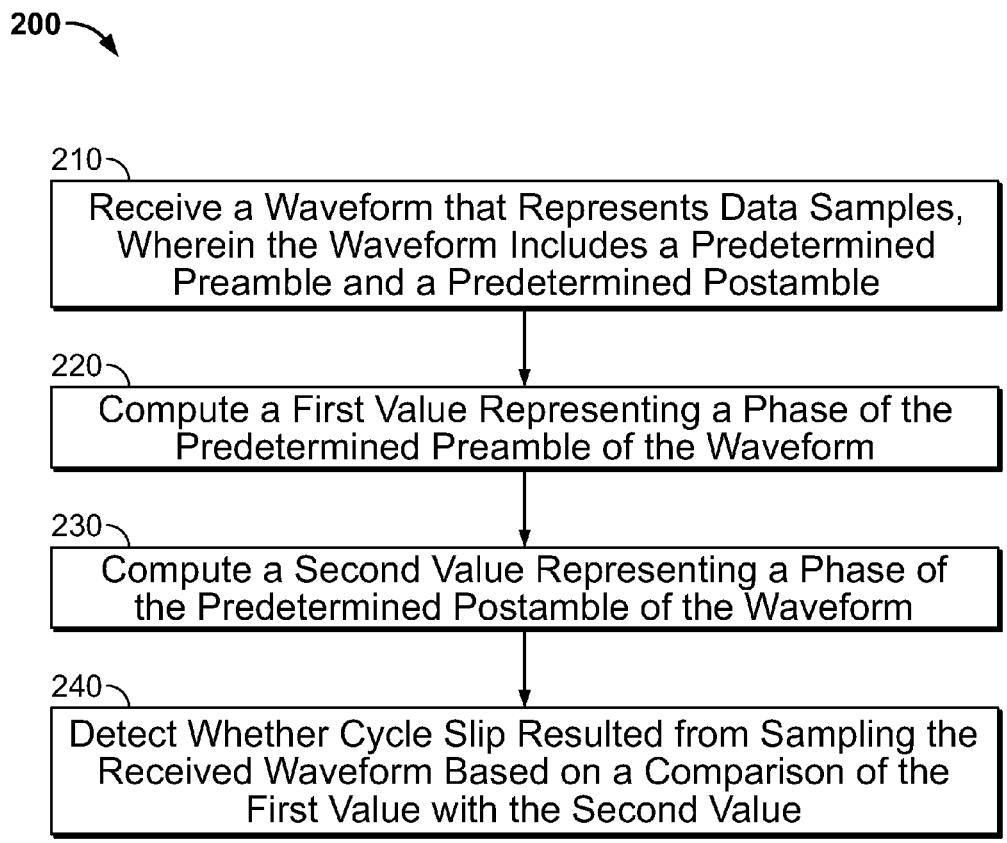
FIG. 2 illustrates a process for detecting cycle slip and/or framing error in accordance with an embodiment of the present disclosure.

FIG. 2 illustrates a process 200 for detecting cycle slip and/or framing error in accordance with an embodiment of the present disclosure. At 210, a waveform that represents data samples is received. The waveform may include a predetermined preamble and a predetermined postamble. For example, control circuitry 130 may receive a waveform from receiver 120 (FIG. 1).

At 220, a first value representing a phase of the predetermined preamble of the waveform is computed. For example, control circuitry 130 may estimate a phase of the preamble from ADC samples in the preamble portion of the waveform. Control circuitry 130 may estimate the phase of the preamble in accordance with equation 1.

At 230, a second value representing a phase of the predetermined postamble of the waveform is computed. For example, control circuitry 130 may estimate a phase of the postamble from ADC samples in the postamble portion of the waveform. Control circuitry 130 may estimate the phase of the postamble in accordance with equation 2.

At 240, a detection is made as to whether cycle slip occurred from sampling the received waveform based on a comparison of the first value with the second value. For example, control circuitry 130 may compare a difference between the estimated phases of the preamble and the postamble to a predetermined value. When the difference between the estimated phases does not correspond to the predetermined value, control circuitry 130 may detect the presence of cycle slip and/or framing errors and adjust the demodulation and decoding of a received waveform to compensate for cycle slip and/or framing errors (e.g., this compensation may be based on how much or how little the difference between the estimated phases exceeds or is lower than the predetermined value).

The foregoing describes methods and an apparatus for detecting cycle slip and/or framing errors in a received waveform. The above-described embodiments of the present disclosure are presented for the purposes of illustration and not of limitation. Furthermore, the present disclosure is not limited to a particular implementation. For example, one or more steps of methods described above may be performed in a different order (or concurrently) and still achieve desirable results. In addition, the disclosure may be implemented in hardware, such as on an application-specific integrated circuit (ASIC) or on a field-programmable gate array (FPGA), The disclosure may also be implemented in software.

What is claimed is:

1. A method for detecting cycle slip, the method comprising:
   receiving, with control circuitry, a waveform that represents data samples, wherein the waveform includes a predetermined preamble and a predetermined postamble;
   computing a first value representing a phase of the predetermined preamble of the waveform;
   computing a second value representing a phase of the predetermined postamble of the waveform; and
   detecting, with the control circuitry, whether cycle slip occurred during sampling the received waveform based on a comparison of the first value with the second value.

2. The method of claim 1 further comprising:
   sampling a portion of the received waveform corresponding to the preamble to compute the first value.

3. The method of claim 1, wherein at least one of the predetermined preamble and predetermined postamble corresponds to a periodic pattern.

4. The method of claim 1 further comprising demodulating the received waveform to retrieve the data samples.

5. The method of claim 1 further comprising determining a cycle slip in response to determining that a difference between the first value and the second value corresponds to a fixed constant.

6. The method of claim 1, wherein the first value is computed in accordance with:

$$\theta_{preamble} = \tan^{-1}\left(\frac{\sum_{n=0}^{n_{preamble}-1} y(n)\cos(2\pi n/k_{preamble})}{\sum_{n=0}^{n_{preamble}-1} y(n)\sin(2\pi n/k_{preamble})}\right)$$

where $\theta_{preamble}$ is the first value, y(n) is the received preamble samples, $n_{preamble}$ is a number of samples identified in the predetermined preamble, n is a counting index of waveform samples, and $k_{preamble}$ is a constant representing a period of the preamble.

7. The method of claim 6, wherein the second value is computed in accordance with:

$$\theta_{postamble} = \tan^{-1}\left(\frac{\sum_{n=n_{preamble}+n_{data}}^{n_{preamble}+n_{data}+n_{postamble}-1} y(n)\cos(2\pi n/k_{postamble})}{\sum_{n=n_{preamble}+n_{data}}^{n_{preamble}+n_{data}+n_{postamble}-1} y(n)\sin(2\pi n/k_{postamble})}\right)$$

where $\theta_{postamble}$ is the second value, y(n) is the received postamble samples, $n_{postamble}$ is a number of samples in the predetermined postamble identified, $n_{data}$ is a number samples of a data portion of the waveform that is between the preamble and the postamble, and $k_{postamble}$ is a constant representing a period of the postamble.

8. The method of claim 7, wherein the cycle slip is detected in accordance with:

$(k_{postamble}\theta_{postamble}/2\pi - k_{preamble}\theta_{preamble}/2\pi) - \Delta\theta_{target}$ where $\Delta\theta_{target}$ is a predetermined value.

9. The method of claim 1, wherein the second value is computed from digitally converted samples in the postamble portion of the waveform.

10. The method of claim 1, wherein the decoding comprises:
    sampling the waveform using an analog-to-digital converter to produce a sampled output; and
    recovering the data samples by processing the sampled waveform with a Viterbi decoder.

11. A system for detecting cycle slip, the system comprising:
    control circuitry configured to:
    receive a waveform that represents data samples, wherein the waveform includes a predetermined preamble and a predetermined postamble;
    compute a first value representing a phase of the predetermined preamble of the waveform;
    compute a second value representing a phase of the predetermined postamble of the waveform; and
    detect whether cycle slip occurred during sampling the received waveform based on a comparison of the first value with the second value.

12. The system of claim 11, wherein the control circuitry is further configured to:
    sample a portion of the received waveform corresponding to the preamble to compute the first value.

13. The system of claim 11, wherein at least one of the predetermined preamble and predetermined postamble corresponds to a periodic pattern.

14. The system of claim 11, wherein the control circuitry is further configured to demodulate the received waveform to retrieve the data samples.

15. The system of claim 11, wherein the control circuitry is further configured to determine a cycle slip in response to determining that a difference between the first value and the second value corresponds to a fixed constant.

16. The system of claim 11, wherein the first value is computed in accordance with:

$$\theta_{preamble} = \tan^{-1}\left(\frac{\sum_{n=0}^{n_{preamble}-1} y(n)\cos(2\pi n/k_{preamble})}{\sum_{n=0}^{n_{preamble}-1} y(n)\sin(2\pi n/k_{preamble})}\right)$$

where $\theta_{preamble}$ is the first value, y(n) is the received preamble samples, $n_{preamble}$ is a number of samples in the predetermined preamble, n is a—counting index of waveform samples, and $k_{preamble}$ is a constant representing a period of the preamble.

17. The system of claim 16, wherein the second value is computed in accordance with:

$$\theta_{postamble} = \tan^{-1}\left(\frac{\sum_{n=n_{preamble}+n_{data}}^{n_{preamble}+n_{data}+n_{postamble}-1} y(n)\cos(2\pi n/k_{postamble})}{\sum_{n=n_{preamble}+n_{data}}^{n_{preamble}+n_{data}+n_{postamble}-1} y(n)\sin(2\pi n/k_{postamble})}\right)$$

where $\theta_{postamble}$ is the second value, y(n) is the received postamble samples, $n_{postamble}$ is a number of samples in the predetermined postamble, $n_{data}$ is a number samples of a data portion of the waveform that is between the preamble and the postamble, and $k_{postamble}$ is a constant representing a period of the postamble.

18. The system of claim 17, wherein the cycle slip is detected in accordance with:

$$(k_{postamble}\theta_{postamble}/2\pi - k_{preamble}\theta_{preamble}/2\pi) - \Delta\theta_{target}$$

where $\Delta\theta_{target}$ is a predetermined value.

19. The system of claim 11, wherein the second value is computed from digitally converted samples in the postamble portion of the waveform.

20. The system of claim 11, wherein the control circuitry is further configured to:
   sample the waveform using an analog-to-digital converter to produce a sampled output; and
   recover the data samples by processing the sampled waveform with a Viterbi decoder.

* * * * *